Nov. 29, 1960 — L. T. SACHTLEBEN — 2,961,920
COMPOSITE PHOTOGRAPHY
Filed March 15, 1957 — 2 Sheets-Sheet 1
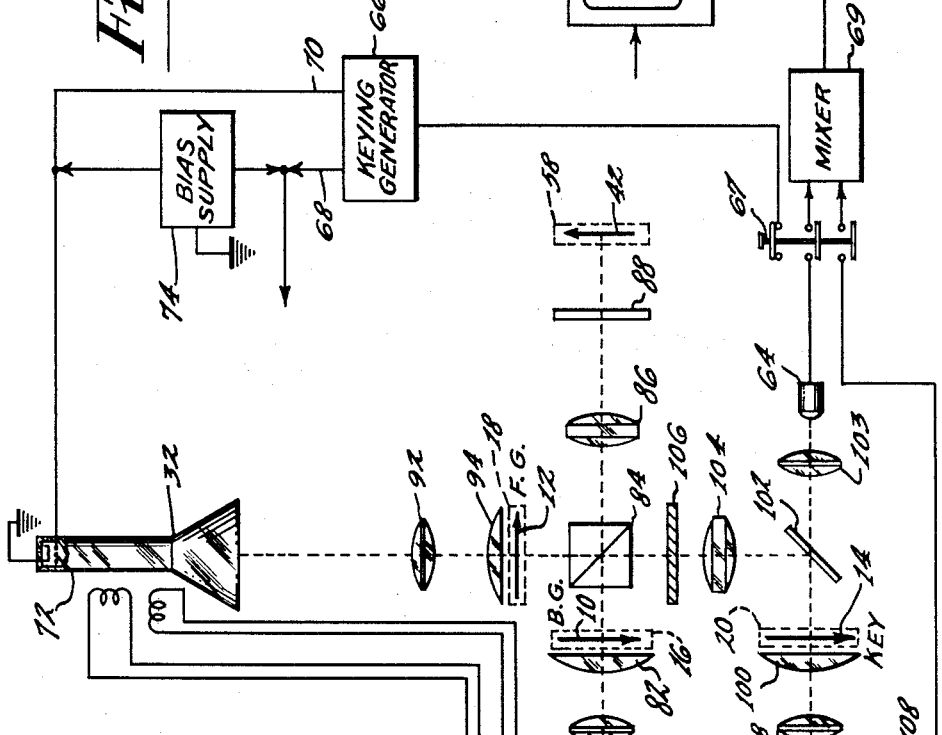
Fig. 1.
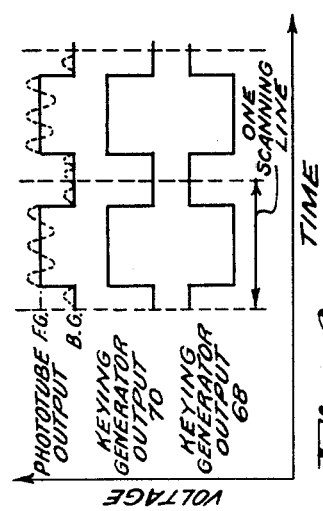
Fig. 2.
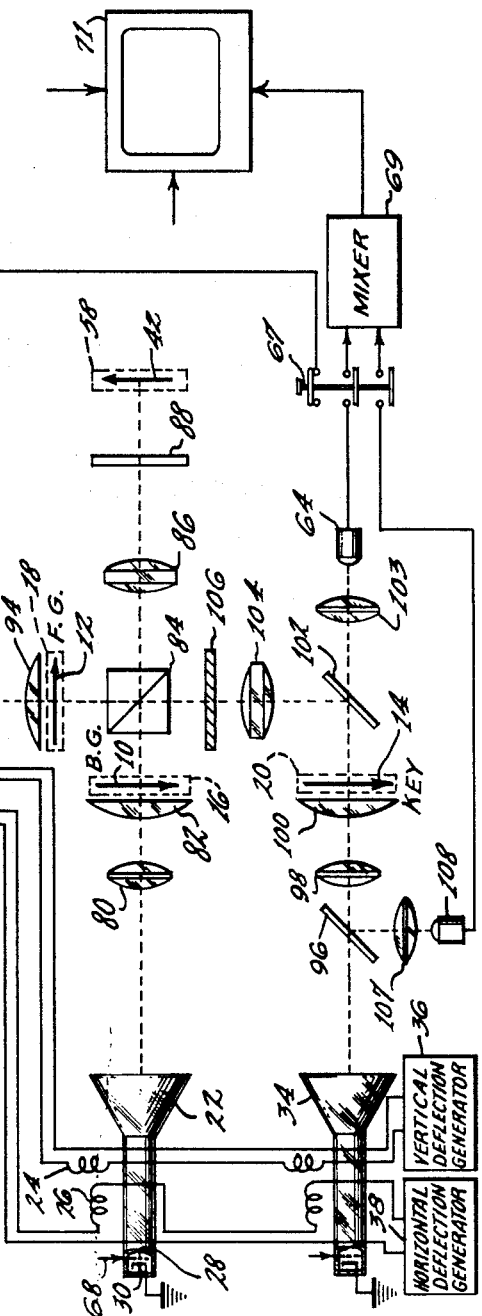
INVENTOR.
Lawrence T. Sachtleben
BY
ATTORNEY.

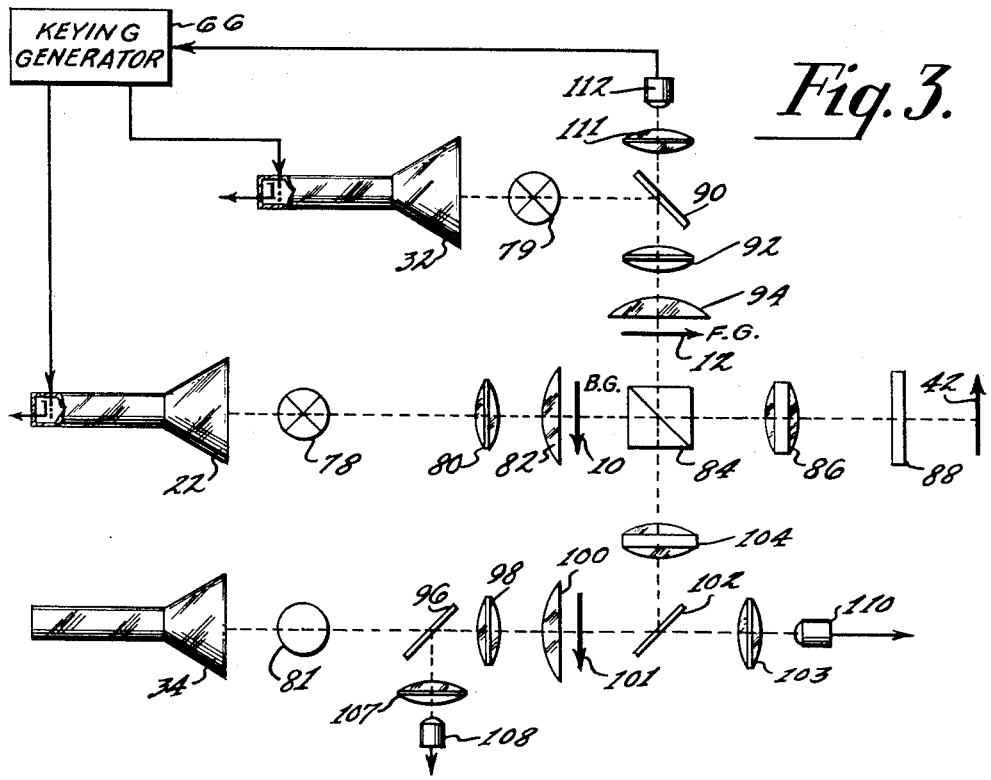
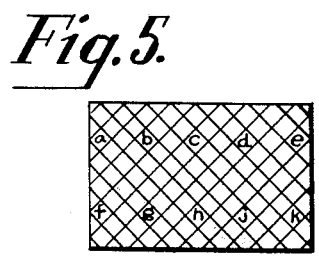
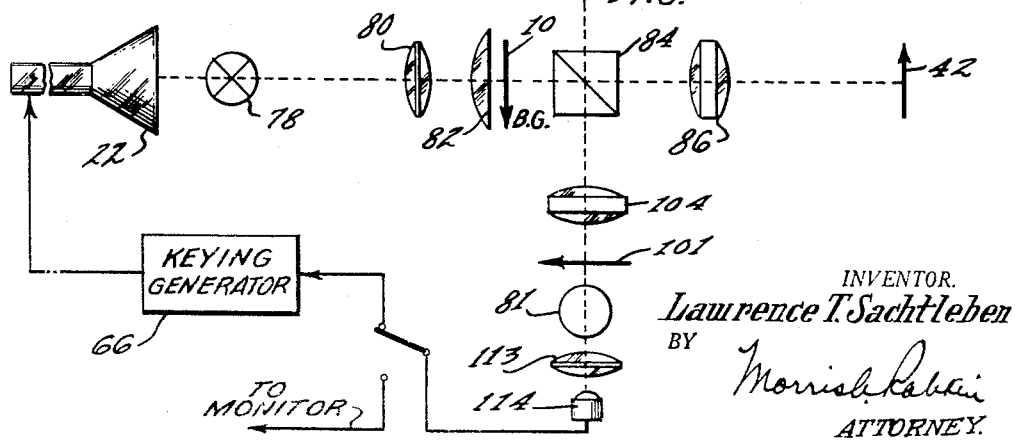

United States Patent Office 2,961,920
Patented Nov. 29, 1960

2,961,920

COMPOSITE PHOTOGRAPHY

Lawrence T. Sachtleben, Haddonfield, N.J., assignor to Radio Corporation of America, a corporation of Delaware Filed Mar. 15, 1957, Ser. No. 646,339

9 Claims. (Cl. 88—24)

This invention relates to a system for making a double composite photograph from a plurality of photographs.

Various forms of motion-picture composite photography are described in the article "Some Special Photographic Effects Used in Motion-Picture Production," by Kellogg and Abbott, in the Journal of the Society of Motion Picture and Television Engineers, vol. 64, February 1955, page 57. One form of such composite photography is known as the traveling-matte process. This traveling-matte process affords a system for combining a foreground, or action, photograph with a background photograph.

In copending patent applications by G. L. Dimmick, Serial No. 646,321, filed March 15, 1957, and by H. E. Haynes, Serial No. 646,340, filed March 15, 1957, systems are described that use scanning illumination techniques for making composite photographs such as the traveling-matte composites.

It is among the objects of this invention to provide:
A new and improved composite photography system;
A new and improved traveling-matte composite photography system;
A new and improved composite photography system employing scanning illumination techniques; and
A new and improved electronic scanning and optical system for a composite photography system.

In accordance with this invention, an electronic scanning and optical system includes a plurality of cathode ray tubes and individual optical trains each for directing light from one of the tubes to illuminate one of a plurality of photographic transparencies. Common optical train means are arranged to direct light that passes through one or more of the transparencies to expose a photographic film, to provide keying information, and to direct light from the individual optical trains to a common image plane to provide signals for registering the rasters of the tubes with respect to each other.

The foregoing and other objects, the advantages and novel features of this invention, as well as the invention itself both as to its organization and mode of operation, may be best understood from the following description when read in connection with the accompanying drawings, in which like reference numerals refer to like parts, and in which:

Figure 1 is a schematic block and optical diagram of a composite photography system embodying this invention in which three cathode ray tubes and three input films are employed;

Figure 2 is an idealized graph of the time relationships of waveforms that occur during operation of the system of Figure 1;

Figure 3 is a schematic block and optical diagram of a modification of the system of Figure 1 in which three cathode ray tubes and two input films are employed;

Figure 4 is a schematic block and optical diagram of another modification of the system of Figure 1 in which two cathode ray tubes and two input films are employed; and Figure 5 is a front view of the grid structure of a reticle that may be used with this invention.

In the composite photography system shown in Figure 1, three input photographs 10, 12, and 14 are shown. The first film is sometimes designated a background (B.G.) film in composite photography. The second film is sometimes designated the foreground (F.G.), or action, film. The foreground film 12 may be photographed with the action appearing against a backing that provides in the film 12 a surround to the action that has an optical characteristic clearly distinct from the action image area. In this way, there is a transparent border region around the foreground action in the film 12. The third film 14 is a key film which clearly indicates the border region of the foreground film 12. The action region and surround region in the key film 14 should be distinct. In the system of Figure 1, the films 10, 12, and 14 are photographic transparencies. With such photographic transparencies, the key film should provide two distinct transmission regions for the action and background, respectively. The distinction in this key film 14 may be either spectral or neutral. For example, the key film 14 may be a silhouette of the action against the background.

Three printer projector heads 16, 18, and 20 are provided for the films 10, 12, 14, respectively. These heads 16, 18, and 20 each include a film transport system for positioning the films in suitably registered positions.

The background film 10 is scanned by means of a flying-spot cathode ray tube 22. This tube 22 has vertical and horizontal deflection coils 24 and 26 and a suitable electron gun that includes a control electrode 28 and a cathode 30. Light is directed to the foreground film 12 and the key film 14 by means of similar cathode ray tubes 32 and 34, respectively. The vertical deflection coils of these three cathode ray tubes 22, 32, and 34 are energized from a common vertical deflection generator 36, and the corresponding horizontal deflection coils are energized from a horizontal deflection generator 38. With this deflection arrangement and by suitable common power supplies (not shown) for the electron guns, each line of the rasters of the three tubes 22, 32, and 34 may be arranged to be synchronous and in registration.

Light from the screen (not shown) of the cathode ray tube 22 is directed by an objective imaging lens 80 to the film 10. The background film 10 is imaged onto a sensitized photographic film 42 by means of an objective lens 86. A condenser lens 82 images the lens 80 at the objective lens 86. A splitter cube 84 is interposed to allow an optical combination with the foreground imaging system. A filter 88 is used if color input films are employed and composite color separations are the outputs. Lenses 92 and 94 in the foreground film imaging system perform similar functions to the lenses 80 and 82, respectively. The splitter cube 84 and the lens 86 also image the foreground film 12 onto the unexposed film 42. A suitable camera 58 for the unexposed film 42 has a gate transport system operated in synchronism and registry with those of the printer heads 16, 18, and 20. The foreground film tube 32 may be oriented to be parallel to the tube 22 and a plane mirror used in its optical train.

The keying cathode ray tube 34 is followed by an optical train that is similar to the other two, which train includes a pellicle 96, or a semi-transparent mirror, an objective lens 98, a condenser lens 100, the key film 14, a semi-transparent mirror 102, and an objective lens 104. A shutter 106 is positioned between the objective lens 104 and the splitter cube 84. The shutter 106 is shown in the closed condition in Figure 1. A phototube 64 receives light passing through the semi-transparent mirror 102 via a condenser lens system 103. Another phototube 108 receives light reflected by the pellicle 96 via a condenser lens system 107. The objective 104 is generally similar to the objective 86, and the pellicle 96 may be made sufficiently thin so as not to impair the similarity of the optical trains.

The output of the phototube 64 is applied to a keying generator 66 via an amplifier (not shown) and a manually-operated switch 67. The keying generator 66 is a circuit that provides two different voltage levels at the outputs 68 and 70 which are respectively connected (for example, to the grids 28 and 72) to modify the grid-cathode voltages of the tubes 22 and 32. A bias voltage supply 74 for these grid-cathode circuits is also connected to these grids 28 and 72. Standard techniques for blanking the beams of the tubes 22 and 32 on each horizontal and vertical deflection retrace may be used.

The generator 66 may take different forms. For example, this generator 66 may be a Schmitt trigger circuit which assumes two stable conditions in response to input voltage amplitudes in two distinct ranges. For one of these two trigger circuit conditions, the voltage levels at the outputs 68 and 70 are such that the cathode ray tube 22 is triggered on and the cathode ray tube 32 is triggered off. For the other such condition, the reverse conditions in the tubes 22 and 32 are brought about.

The phototubes 64 and 108 are connected via the switch 67 to a video mixer 69. The output of the mixer 69 is applied to a cathode ray tube monitor display 71 such as a direct current oscilloscope having means for spot intensity modulation. The vertical and horizontal deflection system of the monitor display 71 may be driven by the generators 36 and 38, respectively, so that the display 71 is operated synchronously with the tubes 22, 32, 34.

Reference is made to the idealized graph of Figure 2 to describe certain time relationships in the operation of the system of Figure 1. For purposes of description, suppose that the key film 14 has a low density (high transmission) in the foreground regions, and a high density (low transmission) in the background regions. Under such circumstances, as shown in Figure 2, the output of the photocell 64 is a low voltage level in the background regions and a high voltage level in the foreground regions. If the key film 14 is in the nature of a silhouette with uniform densities in the two regions corresponding to foreground and background, the photocell output is either of two voltage levels corresponding respectively to the foreground and background regions. The key film 14 may also have picture information in either or both the foreground and background regions. Under such circumstances, the photocell output would be in the form of two nonoverlapping voltage ranges corresponding respectively to the nonoverlapping ranges of density in the foreground and background regions. Possible photocell outputs for this latter situation are shown in broken lines in Figure 2.

The cathode ray tube 34 scanning the key film 14 produces two voltage levels at the output of the photocell 64 as it traverses a line of the key film 14 that crosses both foreground and background regions. The waveforms for two such scanning lines are shown in Figure 2. During scanning of the background region (with the switch 67 in the condition shown in Figure 1, and the shutter 106 closed), the photocell output applied to the keying generator 66 (under the conditions set forth by way of example) is such that the voltage at the output 68 is relatively high and the voltage at the output 70 is relatively low. With these generator output voltages, the cathode ray tube 22 is turned on and the cathode ray tube 32 is turned off. Thus, as the background region of the key film 14 is scanned, the corresponding parts of the background film 10 are illuminated by the scanning light spot from the cathode ray tube 22, and the corresponding parts (the surround) of the foreground film 12 are not illuminated. Accordingly, the illuminated part of the background film 10 is imaged on the unexposed photographic film 42 to expose that portion of the film 42.

When the scanning light spot from the screen of the cathode ray tube 34 moves across the border between the background and foreground regions of the key film 14, the photocell output changes to a relatively high voltage level to trigger the generator 66 to the reverse condition. At this time, the voltages at the outputs 68 and 70 are such that the foreground cathode ray tube 32 is turned on and the background cathode ray tube 22 is turned off. As a result of the synchronous operation of the tubes 32 and 34 and the optical registration of the foreground film 12 and the key film 14, the scanning light spot of the cathode ray tube 32 is directed across the border into the foreground region at the same time that the scanning light spot from the cathode ray tube 34 moves across the border into the foreground region of the key film 14. The illuminated portion of the foreground film 12 is imaged on the photographic film 42 to expose the corresponding portions of that film 42. The background film 10 is not illuminated at that time, and, therefore, portions of that background film corresponding to the foreground are omitted from the composite exposure on the film 42. Accordingly, the planes of the foreground image on the composite film 42 appear to be in front of the planes of the background image on that film 42.

When the scanning light spot of the cathode ray tube 34 imaged on the key film 14 moves back across the border of the foreground region into the background region, the output of the photocell 64 is such that the generator 66 is triggered back to turn on the background cathode ray tube 22 and turn off the foreground cathode ray tube 32. Accordingly, in raster positions that are imaged on the surround, the light spot of the tube 22 is extinguished, and the surround of the foreground film 12 is not illuminated. However, the corresponding portion of the background film 10 is again illuminated. Accordingly, the portions of the background film that should surround the foreground image are again imaged on the composite film 42 to expose that film.

This operation is repeated in a similar manner with each successive scanning line as indicated in the graph of Figure 2. Depending upon the subject matter of the foreground film 12, which determines the keying effects of the key film 14, there may be a plurality of switching operations of the type described above with respect to Figure 2, or there may be no switching operation in a particular line, the exposure for that particular line being either all foreground or all background. Thus, with the complete scanning of the films 10, 12, and 14, a composite film is exposed, and this exposed film has, in visual effect, a foreground image inserted in front of a background image.

With the system of Figure 1, there are no optical limitations in the surround region of the foreground film 12 except as limitations may be necessary to provide a suitable foreground film for making a key film 14. The input films 10 and 12 may be black and white transparencies and either positives or negatives depending upon the requirements of a particular system. The composite film 42 for such inputs is likewise a black and white film. The input films 10 and 12 may also be color transparencies. The composite film 42 is then either a black and white separation or a color positive from a color negative, depending upon the photographic printing system employed. If the distinction between the foreground and background regions in the key film 14 are spectral, then a suitable filter (not shown) may be needed between the key film 14 and the photocell 64. Where the scanned films have spectral characteristics, the spectral characteristics of phosphors in an illuminating cathode ray tube screen become significant. Among the known techniques for deriving a suitable key film is the exposure of an ultraviolet sensitive film (together with the exposure of the foreground film) by the foreground scene placed in front of a screen back-lighted with ultraviolet light.

The cathode ray tubes 22 and 32 are used only as sources of illumination for optically imaging portions of the two input film images into a single composite image. Thus, there is no resolution limitation imposed by the size of the scanning light spot except in the vicinity of the border of the foreground image. The effect of the finite scanning spot size is to reduce somewhat the sharpness of the boundary line. The keying response from fine border detail depends upon the phosphor decay time, spot size, and scanning rate. Since the key cathode ray tube 34 is used to generate an electronic switching signal, its phosphor should have a relatively fast decay. The illuminating tubes 22 and 32 may have relatively slow decay times, one within the order of time for changing film frames, as far as the requirements of the printing operation are concerned. In other optical and physical characteristics, all three tubes should be the same to maintain raster registration.

During the printing operation, scanning light spots on the screens of the cathode ray tubes 22 and 32 are respectively imaged upon the background and foreground films 10 and 12 by exactly similar optical elements. The background and foreground films 10 and 12 are imaged in the same plane, the plane of the composite film 42, by the common optical train that includes the splitter 84, the objective 86, and filter 88.

For purposes of set up and checking raster registration, the shutter 106 is opened, and the switch 67 is actuated. The phototubes are then connected to the mixer 69, and the connection to the keying generator 66 is broken.

In the splitter cube 84, half the light from the background film 10 and half the light from the foreground film 12 is directed into the objective lens 104 (when the shutter 106 is opened). This objective 104 brings the images of the background and foreground films 10 and 12 into focus in the plane of the key film 14, where the images of these films 10 and 12 have the identical relative positions of the images at the composite film 42 due to precise construction of the splitter cube 84.

The scanning rasters of the three tubes 22, 32, and 34 may be registered by means of a reticle inserted in the position of the key film 14. An example of a suitable reticle is shown in Figure 5. It has cross-lines over the entire raster and distinguishing indexing marks. The scanning rasters of the tubes 22 and 32 with the films 10 and 12 removed are imaged on this reticle (in the plane of the key film 14) when the shutter 106 is opened. This scanning light passes through the objective 98, and part of it is removed to the phototube 108 by means of the pellicle 96. The output of this phototube 108 is fed to the monitor display 71 which is operated synchronously with the tubes 22, 32. On the screen of the monitor display 71, images of the reticle due to the scanning light from the tubes 22, 32 appear. Fast decay phosphors should be used in the tubes 22, 32, 34 to obtain good images for registration. The scanning and raster characteristics of the tubes 22 and 32 may be then adjusted until only a single image of the reticle in the plane of the key film 14 is seen on such a monitor. This single-image condition insures precise registration of the scanning rasters at the plane of the composite film 42 throughout the entire cycle of scan.

The keying tube 34 is also sharply focused on this reticle in the plane of the key film 14. The scanning of such a reticle by the scanning spot of the tube 34 is detected by the phototube 64, and this phototube's output is mixed with the output of the phototube 108 and applied to monitor display 71. The images displayed by the manitor display 71 may be those due to the scanning rasters of any two or all three of the tubes 22, 32, 34. The scanning properties of the keying tube 34 may be adjusted with the others under these conditions until only a single image of the reticle appears on the monitor. Under the condition of a single image, the scanning spots of all three tubes 22, 32, and 34 are in precise register throughout the scanning raster as required. Pellicle 96 can be removed during the exposure of the composite film 42 and reinserted during the registration operation.

Precise registration of the rasters of illuminating tubes 22 and 32 is necessary to prevent any gaps between the background and foreground images in the composite 42 and any overlaps between those exposed images. Unless such registration exists, the geometry of the insertion blanking of the background tube may be displaced to one side of the action image of the foreground film. Both vertical and horizontal registration is necessary. For similar reasons, the key tube 34 must be registered with the others.

The exact similarity of the optical trains for the foreground and background films 12 and 10 ensures that the images of those films 12 and 10 are superimposed in proper relation in the plane of the composite film 42. Unless these images are precisely superimposed, it would not be possible to key these images on and off at a common boundary. The identity of the two optical trains in their imaging action prevents differences in image magnification, and prevents differences in anamorphosis and lens distortion that would otherwise require correction. Thus, this optical identity ensures point to point correspondence in the scanning of all the images. With the printing optics identical, the scanning rasters may be made identical and proper composites may be produced.

Thus, with the optical system shown in Figure 1, exactly similar optical trains are provided between the scanning tubes 22 and 32 and the input films 10 and 12 and a common train is provided between those films 10 and 12 and the film 42 to be exposed as a composite. These optical trains are used with another common train to scan a common image with these two tubes (as well as with the third keying tube) to provide information for registering the scanning rasters of the tubes. During the printing operation, the optical trains are properly isolated from each other.

In the modification of Figure 3, an optical and scanning system is shown in which the foreground film 12 provides the keying information, and a key film is not needed. In Figure 3, parts corresponding to those previously described are referenced by the same numerals.

The background cathode ray tube 22 is followed by an optical train that is the same as that described above except that it includes a polarization sheet 78 functioning as an analyzer. The foreground cathode ray tube 32 is followed by a similar optical train that additionally includes a polarization analyzer 79 and a partially-transparent mirror 90 that reflects the scanning light to the objective lens 92. Because of light losses in this mirror 90, a neutral density compensating plate may be used in the background optical train to ensure uniform efficiencies for both trains. Adjustments of the light intensities of the tubes 22 and 32 may also be used for this purpose. The cathode ray tubes 22 and 32 have parallel orientations as do the scanning spots across the screens of these two tubes.

The keying cathode ray tube 34 is followed by an optical train that is similar to the other two, which train includes a polarizer 81 and a reticle 101 (instead of the key film 14 of Figure 1). The shutter 106 is omitted from the arrangement of Figure 3, which results in the scanning light from the key tube 34 being imaged on the foreground film 12. The latter imaging action is due to the reversible imaging action of the optical trains. The lenses 94 and 92 direct light passing through the film 12 to a phototube 112. A phototube 110 receives light passing through the semi-transparent mirror 102. The phototube 112 receives light passing through the mirror 90 (via a condenser lens system 111) and originating from the tube 34 via the mirror 102, objective 104, splitter 84, and film 12. The output of the phototube 112 is applied to the keying generator 66. The phototube 108 receives light reflected by the pellicle 96, and its output is mixed with the output of the phototube 110 (or, alternatively, with the output of the phototube 112) and applied to a monitor display in a manner similar to that described above with respect to Figure 1.

In operation, the system of Figure 3 is similar to that of Figure 1, except that the foreground film 12 itself is used to supply the keying information. The surround region of this film 12 should have a distinctly different transmission characteristic from that of the action region, either spectral or neutral. For example, the foreground film 12 may have either a clear or an opaque region surrounding the action. If the surround is opaque, the keying generator 66 is connected to operate in a manner similar to that described above in Figure 1. If the surround is clear, there is a reversal in operation which requires that the generator outputs 68 and 70 be interchanged in their connections to the tubes 22 and 32.

The scanning rasters of the three tubes 22, 32, and 34 may be registered by means of the reticle 101 in a manner similar to that described above with respect to Figure 1. The operation of the phototube 110 is similar to that of phototube 64 in this registration operation.

Pellicle 96 and reticle 101 can be removed during the exposure of the composite film 42 in the printing operation, and reinserted during the registration operation. During scanning in the printing operation, clear compensating plates may replace the removed plates 96 and 101.

During the printing operation in which the composite film 42 is exposed, the operation is generally similar to that described above with respect to Figure 1. That is, one or the other of the tubes 22 and 32 illuminates its associated film 10 or 12 to expose the film accordingly. The keying generator 66 controls the operation. The foreground film 12 is scanned by light from the keying cathode ray tube 34 to provide keying signals via the phototube 112. The keying signals turn on one of the tubes 22 and 32 and turn off the other. In this way, the composite film 42 is exposed with the image of the background film 10 except in regions in which the foreground is to be inserted, and in those regions the composite film 42 is exposed with the foreground image.

Light from the tubes 22 and 32 is prevented from being focused on the screen of the tube 34, and vice versa, by the polarizing sheets 78, 79, 81, the polarizer 81 being optically at right angles to the analyzers 79 and 80. In this way, the reflection of spurious light back into the optical trains may be avoided.

Another embodiment of this invention is shown in Figure 4. Parts corresponding to those previously described are referenced by the same numerals. The system of Figure 4 uses two scanning tubes 22 and 32 and two input films 10 and 12. The optical path for imaging the background film 10 onto the composite film 42 is similar to that described above with respect to the system of Figure 1. Likewise, the corresponding optical path for the foreground film 12 is similar to that of Figure 1. A common optical channel for keying and raster registration includes the objective 104, the reticle 101 and a condenser lens for imaging light in the plane of the reticle onto a phototube 114. This phototube 114 receives the light that is transmitted by the foreground film 12 via the relay of optical elements. The output of the phototube 114 triggers the keying generator 66, and the generator output 68 controls the background tube 22 in a manner similar to that described above.

In the system of Figure 4, the surround portion of the foreground film 12 must be effectively opaque to the scanning light from the cathode ray tube 32. That is, in the surround regions of the foreground film 12, there must be no transmission of light to expose the composite film 42.

For the printing operation, the reticle 101 is removed and the polarizing elements 78, 81 are inserted to prevent light from the tube 22 reaching the phototube 114. The foreground cathode ray tube 32 is arranged to be on continuously, and functions both to illuminate the action portion of the foreground 12 to expose the composite film 42 and, also to provide light to operate the phototube 114 and, thereby, the keying generator 66. Only the background cathode ray tube 22 is operated by switching signals from the keying generator 66.

The cathode ray tubes 22 and 32 are operated synchronously in a manner described above with respect to the system of Figure 1. When the scanning light from the tube 32 is directed to a surround region of the foreground film 12, there is no light received by the phototube 114 and its output is such that the keying generator 66 turns the background tube 22 on. Thus, the background tube 22 illuminates the background film 10 to expose the composite film 42 during the time that the scanning light from the foreground tube 32 is directed to the opaque surround region of the film 12.

When the light from the foreground tube 32 is directed to the action region of the foreground film 12, the output of the phototube 14 changes to trigger the keying generator 66. The voltage at the generator output 68 is then such as to turn off the background tube 22. The light from the foreground tube 32 illuminating the action region of the foreground film 12 images that action region onto the composite film 42 to expose the corresponding part of that film 42. This operation continues in a similar manner for each scanning line that traverses a surround region and an action region of the foreground film 12.

For the registration operation, the reticle 101 is inserted in the optical train, and the polarizing elements are removed. The output of the phototube 114 is applied to the monitor display instead of to the generator 66. The rasters of the tubes 22 and 32 may be registered in a manner similar to that described above.

Thus, with the system of Figure 4, common optical train means that includes an objective lens 86 is used to image the illuminated transparencies 10 and 12 onto the film 42 to be exposed as a composite. Common optical train means that includes the objective 104 is used to direct a keying image from the foreground film 12 to the phototube 114. This common means, including the objective lens 104, is also used to provide signals for registration of the rasters of the tubes 22 and 32.

In accordance with this invention, a new and improved electronic scanning and optical system is provided for making composite photographs. The optical system includes means for suitably directing light to expose a composite film, to provide keying information, and to provide information for registering the scanning rasters.

What is claimed is:

1. In a system for exposing a photographic element as a composite of a plurality of photographic transparencies, the combination of a plurality of cathode ray tubes for providing moving light over a raster, each of said tubes being associated with one of said transparencies, a plurality of optically similar optical trains for respectively directing light from said tubes to the associated transparencies, means including photoelectric means arranged to receive light from one of said tubes and transmitted by one of said transparencies for controlling the light intensity of at least one of said tubes, and common optical train means for directing light transmitted by two of said transparencies to expose said element and for directing light from all of said tubes to a common image plane positioned at one of said transparencies whereby the geometrical relations of said rasters may be detected.

2. In a system for exposing a photographic element as a composite of a plurality of photographic transparencies, the combination of a plurality of cathode ray tubes for providing moving light over a raster, each of said tubes being associated with one of said transparencies, a plurality of optically similar optical trains for respectively directing light from said tubes to the associated transparencies, means including photoelectric means arranged to receive light transmitted by one of said transparencies for controlling the light intensity of at least one of said tubes, common optical train means for directing light transmitted by two of said transparencies to expose said element, additional common optical train means for directing light from said one transparency to said photoelectric means, and for directing light from all of said tubes to a common image plane positioned at said one transparency, and means on which the rasters of said tubes are imaged whereby the geometrical relations of said rasters may be detected.

3. In a system for exposing a photographic element as a composite of a plurality of photographic transparencies, the combination of a plurality of three cathode ray tubes for providing moving light over a raster, each of said tubes being associated with one of said transparencies, a plurality of optically similar optical trains for respectively directing light from said tubes to the associated transparencies, means including photoelectric means arranged to receive light from one of said tubes and transmitted by one of said transparencies for controlling the light intensity of the other two of said tubes, common optical train means for directing light transmitted by two of said transparencies to expose said element, additional common optical train means for directing light from said tubes to a common image plane located at said one transparency, and means on which the rasters of said tubes are imaged whereby the geometrical relations of said rasters may be detected.

4. The combination recited in claim 3 wherein said plurality of optically similar trains includes three trains for directing light to three different transparencies.

5. The combination recited in claim 4 wherein said photoelectric means is arranged to receive light from said one tube via a transparency associated with one of said two tubes and via the one of said optically similar optical trains associated with the latter tube and transparency.

6. In a system for exposing a photographic element as a composite of a plurality of photographic transparencies, the combination of a plurality of cathode ray tubes for providing moving light over a raster, each of said tubes being associated with one of said transparencies, a plurality of optically similar optical trains for respectively directing light from said tubes to the associated transparencies, means including photoelectric means arranged to receive light transmitted by one of said transparencies for controlling the light intensity of at least one of said tubes, common optical train means for directing light transmitted by two of said transparencies to expose said element, for directing light from said one transparency to said photoelectric means, and for directing light from said tubes to a common image plane positioned at said one of said transparencies, and means on which the rasters of said tubes are imaged whereby the geometrical relations of said rasters may be detected.

7. In a system for exposing a photographic element as a composite of a plurality of photographic transparencies, the combination of two cathode ray tubes for providing moving light over a raster, each of said tubes being associated with one of said transparencies, a plurality of optically similar optical trains for respectively directing light from said tubes to the associated transparencies, means including photoelectric means arranged to receive light from one of said tubes and transmitted by one of said transparencies for controlling the light intensity of the other one of said tubes, common optical train means for directing light transmitted by two of said transparencies to expose said element, additional common optical train means for directing light from said one transparency to said photoelectric means and for directing light from said tubes to a common image plane positioned at said one transparency, and means on which the rasters of said tubes are imaged whereby the geometrical relations of said rasters may be detected.

8. In a system for exposing a photographic element as a composite of a plurality of photographic transparencies, the combination of two cathode ray tubes for providing moving light over a raster, each of said tubes being associated with one of said transparencies, a plurality of optically similar optical trains for respectively directing light from said tubes to the associated transparencies, means including photoelectric means arranged to receive light from one of said tubes transmitted by one of said transparencies for controlling the light intensity of at least one of said tubes, common optical train means for directing light transmitted by two of said transparencies to expose said element, additional common optical train means for directing light from said tubes to a common image plane, and means for synchronously displaying images of the rasters of said tubes in accordance with the light directed to said common image plane located at the position of said one of said transparencies, whereby the geometrical relations of said rasters at any instant may be detected.

9. In a system for exposing a photographic element as a composite of a plurality of photographic transparencies, the combination of a plurality of cathode ray tubes for providing moving light over a raster, each of said tubes being associated with one of said transparencies, a plurality of optically similar optical trains for respectively directing light from said tubes to the associated transparencies, means including photoelectric means arranged to receive light transmitted by one of said transparencies for controlling the light intensity of at least one of said tubes, common optical train means for directing light transmitted by two of said transparencies to expose said element, said common optical train means including a splitter cube and common lens means for directing images of said two transparencies to an exposure plane, additional common optical train means including additional common lens means for directing light from said tubes to a common image plane positioned at said one of said transparencies, and means on which the rasters of said tubes are imaged whereby the geometrical relations of said rasters may be detected, each of said plurality of similar trains including optical means for relaying that light directed to the associated transparency to both said common lens means.

References Cited in the file of this patent

UNITED STATES PATENTS

| Number | Name | Date |
|---|---|---|
| 1,636,834 | Peters | July 26, 1927 |
| 2,073,370 | Goldsmith | Mar. 9, 1937 |
| 2,164,297 | Bedford | June 27, 1939 |
| 2,172,936 | Goldsmith | Sept. 12, 1939 |
| 2,730,565 | Owens | Jan. 10, 1956 |
| 2,744,443 | Higonnet et al. | May 8, 1956 |
| 2,745,901 | Owens | May 15, 1956 |